(No Model.)
E. PERRETT.
FILTER.
No. 259,041. Patented June 6, 1882.
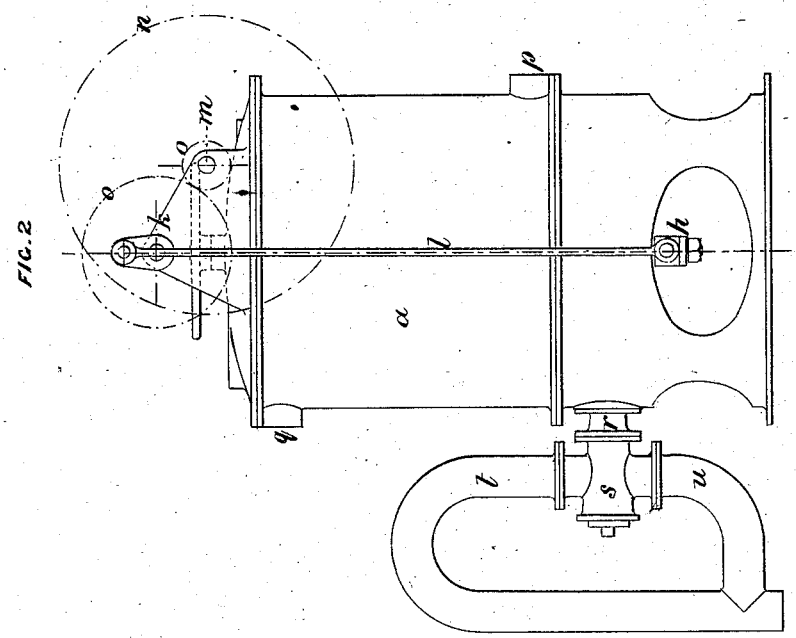
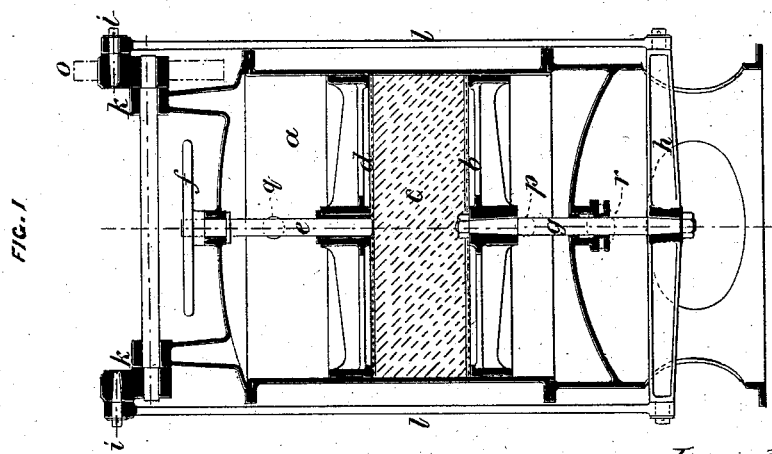
Witnesses:
William Paxton
H. E. Hansmann
Inventor:
Edward Perrett
By his attorney
Charles E. Foster

UNITED STATES PATENT OFFICE.

EDWARD PERRETT, OF VICTORIA CHAMBERS, WESTMINSTER, ENGLAND, ASSIGNOR TO JOHN ELIOT HODGKIN, MANAGING DIRECTOR OF THE PULSOMETER ENGINEERING COMPANY, (LIMITED,) OF LONDON, ENGLAND.

FILTER.

SPECIFICATION forming part of Letters Patent No. 259,041, dated June 6, 1882.

Application filed November 9, 1881. (No model.) Patented in England January 27, 1879, No. 330; in France June 25, 1879, No. 131,422, and in Belgium June 28, 1879, No. 48,618.

*To all whom it may concern:*

Be it known that I, EDWARD PERRETT, a citizen of England, residing at Victoria Chambers, in the city of Westminster, have invented Improvements in Apparatus for Filtering Liquids, (for which I have obtained a patent in Great Britain, No. 330, dated January 27, 1879; in France, No. 131,422, dated June 25, 1879; in Belgium, No. 48,618, dated June 28, 1879,) of which the following is a specification.

This invention relates to a simple and efficient filter for removing impurities held in mechanical suspension in water or other liquids, with provision for the easy and effectual cleansing, when required, of the filtering material.

The essential features of the improved filter consist of a tank or vessel of any convenient form, within which is or are fitted one or more perforated adjustable diaphragms and a perforated piston, the said piston receiving, when required, an alternating motion from levers, cranks, or their mechanical equivalent, worked by hand or by power, while the diaphragm or diaphragms is or are capable of being adjusted as required, by hand or otherwise, toward or from the piston by means of screw-spindles or their equivalents. The space or spaces between the said piston and the upper or lower or upper and lower diaphragm or diaphragms is filled with any suitable compressible filtering or straining material—such, for example, as sponge and the like—which is more or less compressed and released by the movement of the piston and by the adjustment of the diaphragm or diaphragms. The liquid to be filtered is passed through the compressed filtering material and flows off either at the top or bottom of the tank. In order to clean the said filtering material, one or both the diaphragms (when two are employed) are slackened out, so as to afford space for the expansion of the filtering material and for the piston to move between the diaphragms. I prefer, for simplicity, to employ merely a single adjustable perforated diaphragm on the top of the filtering material and a reciprocating perforated piston beneath the same, the filtering material being disposed between the two; but any number of sets of pistons and diaphragms with layers of filtering material may be combined in one and the same filter. By alternately raising and lowering the piston the filtering material will be alternately compressed and released, and by causing a reversed current of liquid to flow at the same time through the filtering material any impurities lodged in the said material and disturbed by the action of the piston will be carried off.

Figure 1 of the accompanying drawings is a vertical section of my improved filter in its simpler form, and Fig. 2 is a side elevation of the same, looking at right angles to Fig. 1.

Similar letters refer to similar parts in both views.

$a$ is the tank; $b$, the perforated piston; $c$, the filtering material; $d$, the perforated diaphragm; $e$, a screw, with hand-wheel $f$ for adjusting the position of the said diaphragm. $g$ is the piston-rod, connected to a cross-head, $h$. $i\ i$ are cranks on a shaft working in bearings $k\ k$ on the top of the tank, the said cranks being connected by the side rods, $l\ l$, to the cross-head $h$. $m$ is the actuating-shaft, also working in bearings on the tank, and driven by a strap and pulley, $n$, or otherwise, said shaft imparting motion to the crank-shaft by the spur-gearing $o$; or the crank-shaft may be driven direct. $p$ is the inlet for the unfiltered liquid. $q$ is the outlet for the filtered liquid, and $r$ is the wash-out for the dirty water during the operation of cleansing the filter.

This apparatus is worked as follows: The piston $b$ being set at its highest position by means of the cranks $i\ i$, the diaphragm $d$ is screwed down, and the filtering material $c$ is then compressed between the piston and the diaphragm. The liquid to be filtered is brought in at $p$, below the piston, and, passing upward through the material $c$, finds an exit by the outlet $q$. When the filtering material is choked and it is desired to clean it the supply is stopped, the wash-out $r$ opened, the diaphragm $d$ is raised, and the cranks rotated, thus raising and lowering the piston $b$. At the same time a reverse current of liquid is brought into the casing through the opening $q$ over the filtering material, which carries away the impurities disturbed by the action of the piston through the wash-out r.

With a view to greater economy of water in cleaning, and to insure the filtering material being surrounded by or immersed in the cleaning-water during the operation of cleaning, I prefer in some cases that the wash-out should communicate through a hollow plug-cock, s, with a rising pipe, t, and with a separate branch pipe, u, for the outflow of the dirty water. The pipe t, through which the washing-water escapes, is carried up to a height corresponding, or thereabout, with the upper surface of the sponge or other compressible filtering material. In washing the filter a reverse current of clean water is allowed to enter at q and pass out at r, after traversing the filtering material, the cock s being turned so as to establish communication between the bottom of the tank a and the rising pipe t, while at the same time the branch pipe u is for the time being closed. The piston is then set to work compressing and releasing the sponge and squeezing out the impurities therefrom, the cock s being afterward turned so as to open the branch u and simultaneously close the pipe t, allowing the dirty water to flow off quickly and in a direct manner through the branch u. These operations may be repeated as often as may be found requisite.

What I claim, and desire to secure by Letters Patent of the United States, is—

The combination, in a filtering apparatus, substantially as specified, of a reciprocating device for alternately compressing and releasing the filtering material, and pipes, arranged as described, to permit a reverse current of liquid for cleaning the said material while the same is being worked.

In witness whereof I have signed my name in the presence of two subscribing witnesses.

EDWARD PERRETT.

Witnesses:
 EDWIN P. ALEXANDER,
  36 *Southampton Buildings, London.*
 FREDK. J. RAPSON,
  *Clerk to Edwin P. Alexander.*